US007657789B1

(12) United States Patent
Gerber et al.

(10) Patent No.: US 7,657,789 B1
(45) Date of Patent: Feb. 2, 2010

(54) MULTI-MACHINE TESTING SYSTEM AND METHOD FOR TESTING SOFTWARE

(75) Inventors: Peter Gerber, Woodinville, WA (US); Jing Tan, Bellevue, WA (US); Michael Robinson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/149,894

(22) Filed: Jun. 10, 2005

(51) Int. Cl.
*G06F 11/00* (2006.01)

(52) U.S. Cl. .............................. 714/25; 714/27; 714/43

(58) Field of Classification Search ................... 714/25, 714/27, 32, 43, 49, 55
See application file for complete search history.

(56) References Cited

U.S. PATENT DOCUMENTS 5,909,589 A * 6/1999 Parker et al. .................. 712/32
6,138,122 A * 10/2000 Smith et al. ............. 707/103 R
6,604,209 B1 * 8/2003 Grucci et al. ................. 714/38
7,114,099 B2 * 9/2006 Bhattacharjee et al. ........ 714/25
7,287,190 B2 * 10/2007 Rosenman et al. ............ 714/32
2004/0015846 A1 * 1/2004 Haisraeli ..................... 717/115
2005/0022194 A1 * 1/2005 Weir et al. .................. 718/100
2005/0125188 A1 * 6/2005 Eden et al. .................. 702/121

* cited by examiner

*Primary Examiner*—Joshua A Lohn
(74) *Attorney, Agent, or Firm*—Merchant & Gould P.C.

(57) ABSTRACT

An integrated test framework is disclosed that allows software testers to easily generate and execute tests of software involving multiple interacting computer systems. A copy of the integrated test framework resides on each computer system in the test. The integrated test framework on each computer system supports the independent testing of software on that system and also the synchronization between the computer systems. A test manager is provided to coordinate the synchronization. All the information necessary to direct the test framework on each of the computer systems is included within a single test script that is propagated to and executed on each computer system. The test script dictates the role of each computer system within the test and includes role specific actions and identifies points at which the computer systems must synchronize together for the passing of data, messages or other communications.

17 Claims, 8 Drawing Sheets

```
#region Using directives

using System;
using System.Collections.Generic;
using System.Text;
using MS.Internal.Test.Automation.Office.Context;
using MS.Internal.Test.Automation.Office.Logging;
using MS.Internal.Test.Automation.Office.Runtime;
using MS.Internal.Test.Automation.Office.TopologyData;
using MS.Internal.Test.Automation.Office.TestClasses;
using MS.Internal.Test.Automation.Office.FileDepot;
using MS.Internal.Test.Automation.Office.Osg.Search;
using MS.Internal.Test.Automation.Office.Osg.Search.Wss;
using MS.Internal.Test.Automation.Office.Search.Stitch;
using MS.Internal.Test.Automation.Office.Search.SharedTools;
using MS.Internal.Test.Automation.Office.SharePoint.Search.Tests;
using MS.Internal.Test.Automation.Office.ContentDataManagement;
using MS.Internal.Test.Automation.Office.DataTableValidator;
using MS.Internal.Test.Automation.Office.PhraseGen;

#endregion

namespace MS.Internal.Test.Automation.Office.SharePointPortal.Search.Tests
{
    [TestClass]
    public class SampleFarmTest : SearchTestBaseClass
    {

        private int randomNumber;

        [Context]
        public int RandomNumber
        {
            get
            {
                return this.randomNumber;
            }
            set
            {
                this.randomNumber = value;
            }
        }

        public SampleFarmTest()
        {
          //  Topology.InitTopology(@"d:\topology.xml");

        }
```

```
        /// <summary>
        /// Set up will run on client only
        /// </summary>
        [Setup]
        [RunOn("<Client>{1}")]
        [TestDescription("Setup.")]
        public override void Setup()
        {
            this.RandomNumber = (new Random(5)).Next(1, 10);

            this.Log.Comment("randome number is: {0}", this.RandomNumber);
            this.Log.Comment("setting up on client.");
            this.Log.Pass("Set up pass.");
        }

        /// <summary>
        /// this method is used to pass cleint context to servers
        /// </summary>
        [Step(1)]
        [TestDescription("exchange context")]
        [SyncContext("RandomNumber", "<client>{1}", "<Search>{*}")]
        public void ExchangeContext()
        {
            this.Log.Comment("randome number is: {0}", this.RandomNumber);
            this.Log.Comment("exchange context");
            this.Log.Pass("ExchangeContext pass.");

        }

        /// <summary>
        /// This test will run on all search boxes after setup method is
run on client machine
        /// </summary>
        [Step(2)]
        [TestDescription("Test Case 1")]
        [RunOn("<Search>{*}")]
        [WaitFor("SyncPointForTearDown", "<Client>{1};<Search>{*}", When =
LocationsToPerform.AfterTestMethod)]
        public void TestCase1()
        {
            this.Log.Comment("Random number from client: {0}",
this.RandomNumber);
            this.Log.Comment("Validating on search.");
            this.Log.Pass("TestCase1 pass.");

        }
```

```
        /// <summary>
        /// Teardown method will be run after all seach boxes finishes
running TestCase1
        /// </summary>
        [Teardown]
        [RunOn("<Client>{1}")]
        [WaitFor("SyncPointForTearDown", "<Client>{1};<Search>{*}", When =
LocationsToPerform.BeforeTestMethod)]
        [TestDescription("Teardown.")]
        public override void Teardown()
        {
            this.Log.Comment("Tearing down  on indexer");
            this.Log.Pass("Teardown pass.");
        }
    }
}
```

MULTI-MACHINE TESTING SYSTEM AND METHOD FOR TESTING SOFTWARE

TECHNICAL FIELD

This application relates generally to the testing of software and more particularly to a system and method for the simultaneous testing of software on multiple computer system.

BACKGROUND OF THE INVENTION

Software, such as computer executable programs or applications, is tested many times before being released to the public to ensure proper operation. The most common test performed on software is a simple test to verify that some functionality is operable. For example, after each substantial revision in the development process to determine if the changes in the new version might have detrimentally affected the operation of the software due to unanticipated conflicts or errors. If a problem, such as an error or exception occurring during the execution of a scenario, is found during a test, software testers may utilize a number of testing tools to evaluate the step by step performance of software and to identify the source of the problem.

Software testing requires the tester to develop a test in which the tester identifies what operational test scenario the target software should perform, i.e. they must define the sequence of actions the software will take during the test. The software testing process typically requires the tester to write a test script that, at a minimum, identifies the target software to be tested and the test scenario to be tested. Additionally, the test script typically configures the computer and target software to a specific starting point and directs the test results to a specific location.

After it has been created, a test script is then executed, such as by a software testing tool or application, which causes the target application (i.e., the software being tested) to perform the actions identified in the test scenario in the test script and to monitor and record the operation of the target software during the test. The results of the test, typically stored in a results data file often referred to as a log file or log, are then inspected by the tester to determine if additional testing is needed or if the tested software has passed the test. The analysis of the logs can be automated and typically result in some sort of "summary" being sent to the tester.

The software testing process becomes complicated when what has to be tested is how software on different computer systems in a network (multi-machine systems) interact or when multiple tests on different computer systems need to be run (such as to perform the same test on different computer systems having different components or software versions). Currently, such testing is handled using remoting. Remoting is a method of peer to peer communication that involves controlling the execution of code on one machine from a second, remote machine (analogous to DCOM or RPC, which is what DCOM is built on top of) by passing parameters and results between both machines.

In general, testing via remoting is very communication intensive and complex. Remoting typically uses TCP/IP or HTTP transport with remote computer. This creates problems when testing machines running firewalls or other security software designed block traffic through ports used by the remoting infrastructure. In addition, because parameters and results need to be passed over the network for every method call during the test, remoting has a large communications overhead potentially skewing the speed performance of the software being tested. In addition, the increased volume of communication also increases the probability of the test failing because of communication failures.

Another drawback of testing using remoting is that only those software elements that have been written to support remoting can be tested. If a software element does not support remoting, there is no way to remotely operate the software. In addition, the remote machines must be preconfigured for each test, increasing the time necessary for each test.

Another drawback of multi-machine testing using remoting is the difficulty in working with more than two machines. Remoting was not designed recreate a network, but rather simply to allow a remote machine to be controlled by a controller computer. Testing using remoting is essentially an exercise in directing multiple machines to interact while also collecting test data using only the remote procedure calls that are available within remoting. Remoting, as a tool, does not allow easy identification and differentiation of multiple remote machines. Thus, in multi-machine tests it is often necessary to preconfigure each machine in the test network so that they can be identified and controlled as necessary to conduct the test. Remoting also does not allow easy coordination of complicated multi-machine communication scenarios.

Another drawback of multi-machine testing using remoting is the final collection and aggregation of data. In typical testing systems, non-result data, that is log files and other diagnostic information that is not directly collected by the machine running the test software but is still relevant to the test, may have to be individually retrieved from each machine in the test network and aggregated into a usable form.

SUMMARY OF THE INVENTION

In accordance with the present invention, the above and other problems are solved by an integrated test framework that allows software testers to easily generate and execute tests of software involving multiple computer systems. A copy of the integrated test framework resides on each computer system in the multi-machine test. The integrated test framework on each computer system supports the independent testing of software on that system. The integrated test framework also supports the synchronization of communications between the various software products being tested on the computer systems. A test manager may be provided to coordinate the synchronization of the different computer systems as necessary so that only synchronization-related messages are passed between the integrated test frameworks on the different computer systems and the test manager during the test. The test manager may have a passive role such as a proxy that simply holds messages from various computer systems involved in the test. Alternatively, the test manager may take a more active roll in directing the test and managing the results data.

In the present invention, all the instructions necessary for directing the actions of all the computer systems in the test are included within a single test script that is propagated to and executed on each computer system. As part of the test, each computer system has been assigned a role. The assignment have been made prior to receipt of the test script, when the test script is propagated, or after receipt of the test script. The test script dictates the actions to be performed by role for each computer system within the test. The concept of role allows for role-specific (and therefore machine-specific) actions and further allows the identification of the points at which the computer systems must synchronize together for the passing of data, messages or other communications. The test script is interpreted by the integrated test framework on each computer system.

In accordance with other aspects, the present invention relates to a system for conducting a test of software on a plurality of computer systems. In the test, each of the plurality of computer systems is assigned and performs a role in the test. More that one computer system may be assigned the same role and, therefore, perform the same actions during a test. The system includes the plurality of computer systems wherein each computer system includes software involved in the test, a copy of a test script, and a test framework controlling the execution of the software based on the test script. A communication network connects each of the plurality of computer systems to support communications between the various computer systems. The testing system also includes a test manager connected to the communication network that interacts with each test framework on each of the computer systems in the test.

In accordance with still other aspects, the present invention relates to a method of independently testing software on a computer system during a test scenario in which the computer system's software must interact with software independently executing on other computer systems. The method includes, in response to a command to execute a test scenario on a computer system, reading, by the test framework on the computer system, a test script. The test framework also configures the computer system to perform a role assigned to the computer system in the test script, wherein the role dictates what software is initialized and executed by the computer system. The test framework also causes, based on the role and a set of actions in the test script associated with the role, the computer system to perform the set of actions. The test framework then halts the performance of the set of actions at a synchronization point in the set of actions defined in the test script until either a designated resume notification is detected by the test framework or a timeout period elapses.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 4*a*, 4*b*, and 4*c* illustrate an exemplary test script in accordance with an embodiment of the present invention.

DETAILED DESCRIPTION OF THE INVENTION

Figure 1:
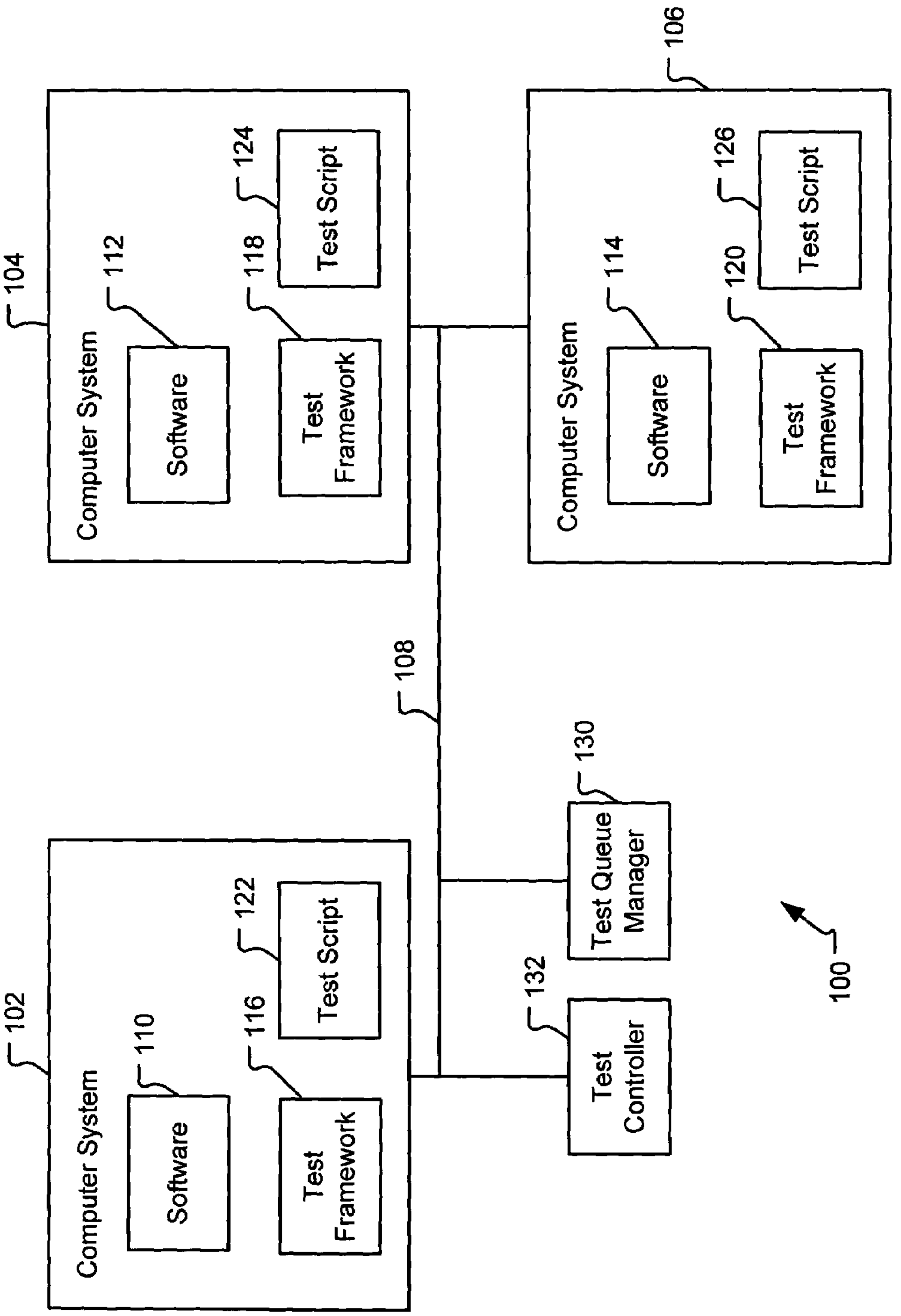
FIG. 1 is a high-level, conceptual illustration of a computing architecture for testing software on multiple computer systems in accordance with an embodiment of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numbers in the drawings refer to like elements throughout.

In general, an embodiment of the present invention may be considered as an integrated test framework that allows software testers to easily generate and execute tests of software involving multiple computer systems. A copy of the integrated test framework resides on each computer system in the test. The integrated test framework on each computer system supports the independent testing of software on that system. The integrated test framework also supports the synchronization of communications between the computer systems.

In order to facilitate the test, the integrated test framework receives and interprets a test script, a copy of which is provided to each computer system prior to the test. The integrated test framework is capable of interpreting this test script to determine its computer system's role in the test and the points at which its computer system must synchronize with one or more of the other computer systems in the test. The integrated test framework, based on the role assigned to its computer for test, is capable of configuring its computer system as appropriate to perform the role assigned and identifying and performing the actions the computer is supposed to take during the test. The integrated test framework is further capable of monitoring the performance of its computer system and storing and returning test data to a central location for analysis as directed by the test script.

FIG. 1 is a high-level, conceptual illustration of a computing architecture 100 for testing software on multiple computer systems in accordance with an embodiment of the present invention. In the embodiment shown, the computer architecture 100 includes three exemplary computer systems 102, 104, 106 that will be the subject of the test. The three computer systems 102, 104, 106 are interconnected by a communications network 108, which can be any type of communications network including, for example, an Ethernet network, a wireless network or via connections to the Internet. It should be understood that embodiments of the present invention are equally applications to architectures including any number of computer systems.

In the embodiment shown, the test architecture 100 further includes a test controller 132 and a test queue manager 130, which are shown as implemented on separate and independent computer systems. In an alternative embodiment, the test controller 132 and the test queue manager 130 roles are implemented on a single computer system. In another alternative embodiment, one of the computer systems 102, 104, 106 to be tested may also act as the test controller 132, as the test controller may be inactive during the test itself. The test controller 132 is responsible for initiating the test and may be used to preconfigure the computer systems 102, 104, 106 to a known starting point that forms the initial configuration of the test. The test controller 132 is further responsible for assigning a role to each computer system 102, 104, 106 in the test. This assignment may be transmitted along with the test script 122, 124, 126 (discussed below) or transmitted as part of the preconfiguration step.

Assignment information and other test information is stored in a well-defined location accessible to each computer system 102, 104, 106. The well-defined location may be a local storage (not shown) on each computer system 102, 104, 106 where the individual test computer test information is stored, or a central location on the network accessible to each test computer 102, 104, 106.

Each computer system 102, 104, 106 to be tested includes software 110, 112, 114 that can be configured and executed by its computer system. In addition, each computer system 102, 104, 106 includes a copy of an integrated test framework 116, 118, 120 (also referred to simply as the "test framework") that can automatically configure and execute the software 110, 112, 114 on its computer system 102, 104, 106 based on the instructions contained in a test script 122, 124, 126. While executing the software 110, 112, 114, the integrated test frameworks 116, 118, 120 monitor the performance of the software 110, 112, 114 and record information concerning the software's performance as results data (not shown).

The integrated test frameworks 116, 118, 120 are referred to herein as a "framework" rather than an application to differentiate them from the software 110, 112, 114 being tested and also because in most of the embodiments described the integrated test frameworks 116, 118, 120 operate in the background on their host computer systems 102, 104, 106, without direct user interaction, for the purpose of managing the operations of testing tools, directing the operation of the software 110, 112, 114 through automation, configuring and initiating the computer operating system (not shown), file management, etc., as necessary during the execution of the test.

In the embodiment, a test is created in the form of a test script 122, 124, or 126. The test script may be created on one of the computer systems in the test or may be created on a separate computer system, such as the test controller 132 in the embodiment shown in FIG. 1. Prior to the start of the test, the test script is propagated to each computer system 102, 104, 106 and each computer system 102, 104, 106 is assigned a role in the test. The test script includes a description of the actions to be performed by each computer system 102, 104, 106 based on its role in the test. When the test is initiated, each test script 122, 124, or 126 is executed by its respective integrated test framework 116, 118, 120 to independently configure and control the operation of the software 110, 112, 114.

During the test, each integrated test framework 116, 118, 120 monitors the progress of its computer system 102, 104, 106 through the actions it is to perform relative to any points of synchronization with other computer systems 102, 104, 106. A synchronization point is a point within the set of actions in the test in which a computer system 102, 104, 106 must either provide or receive a message (for example a request, a response, or some other input) from one or more of the computer systems 102, 104, 106 in the test. Essentially, a synchronization point is a point in the scenario when a computer system 102, 104, 106 communicates to the other computer systems 102, 104, 106 that it has reached that point with a notification. When a computer system 102, 104, 106 independently determines that it has received all the expected notifications from the other systems (as indicated in the test script), the computer system proceeds with the test scenario.

When a point of synchronization is reached by a given computer system 106, a message is sent to a test queue manager 130 by the integrated test framework 116, 118, 120 and the test on that computer system 106 is temporarily halted while the other computer systems 102, 104 continue the test until they reach the same synchronization point. When all computer systems 102, 104, 106 associated with a point of synchronization have reported to the test manager 130 that they have reached the synchronization point, the test queue manager 130 communicates to the integrated test frameworks 116, 118, 120 on each computer systems 102, 104, 106 directing them to proceed with the test, thereby causing the actions on the different systems 102, 104, 106 to be synchronized at each point which interaction between systems 102, 104, 106 is necessary. Not all computer systems 102, 104, 106 need be associated with each synchronization point. For example, in a three computer system test scenario including a client, a web front end and a database server, the client and the web front end may be associated with multiple synchronization points as the client and web front end go through a complicated scenario of passing messages back and forth. However, the database server may only be associated with a few of the same synchronization points.

In an embodiment, the test queue manager 130 is also responsible for propagating the test script 122, 124, or 126 to each computer system 102, 104, 106 and initiating the test so that the test begins on each computer system 102, 104, 106 at approximately the same time.

The test queue manager 130 may take a more or less active roll in the testing process depending on the embodiment of the test system. In one embodiment, the test queue manager 130 is a web proxy server whose function is passive; the test queue manager 130 serving primarily as a central system that holds messages, data, and other information (e.g., the test script itself) from the other computer systems 102, 104, 106 in the test until those machines are ready to process them. In another embodiment, the test queue manager 130 takes a more active role in analyzing the messages received for the computer systems 102, 104, 106 and responds with specific directions or different messages based on the received messages.

Figure 2:
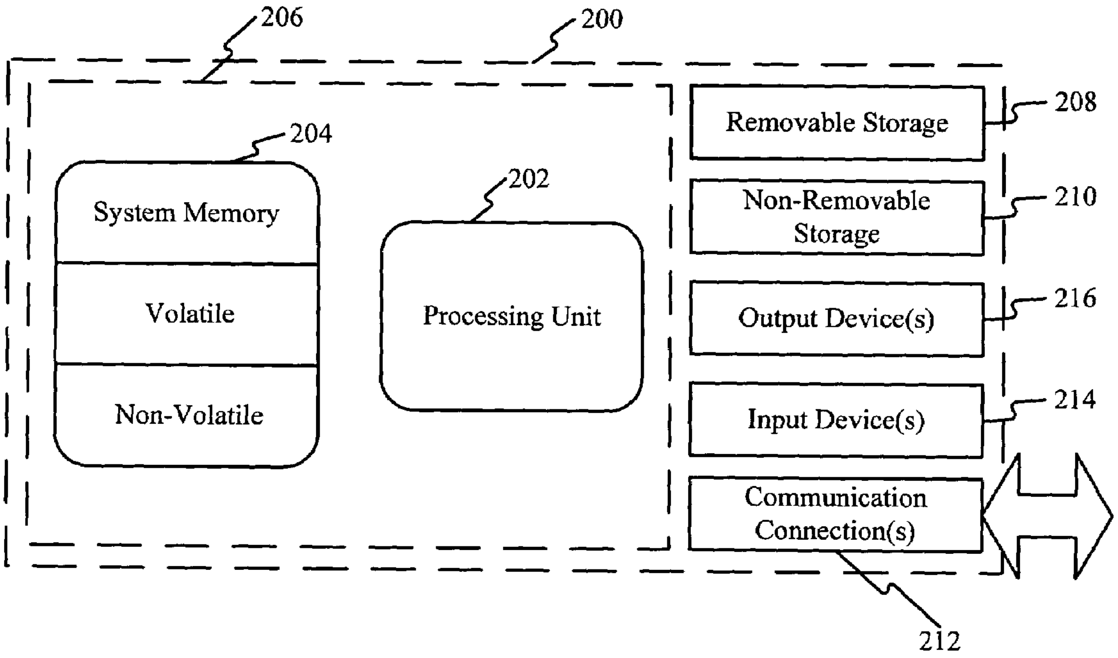
FIG. 2 shows an exemplary computer system upon which embodiments of the present invention may be implemented.

An embodiment of a suitable computer system 102, 104, 106 environment in which the present invention may be implemented is shown in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary computing environment for implementing the embodiments of the present invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.), or some combination of the two. This most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Such computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store the desired information and which can be accessed by device 200 and processor 202. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. These devices, either individually or in combination can form a user interface. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing device 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
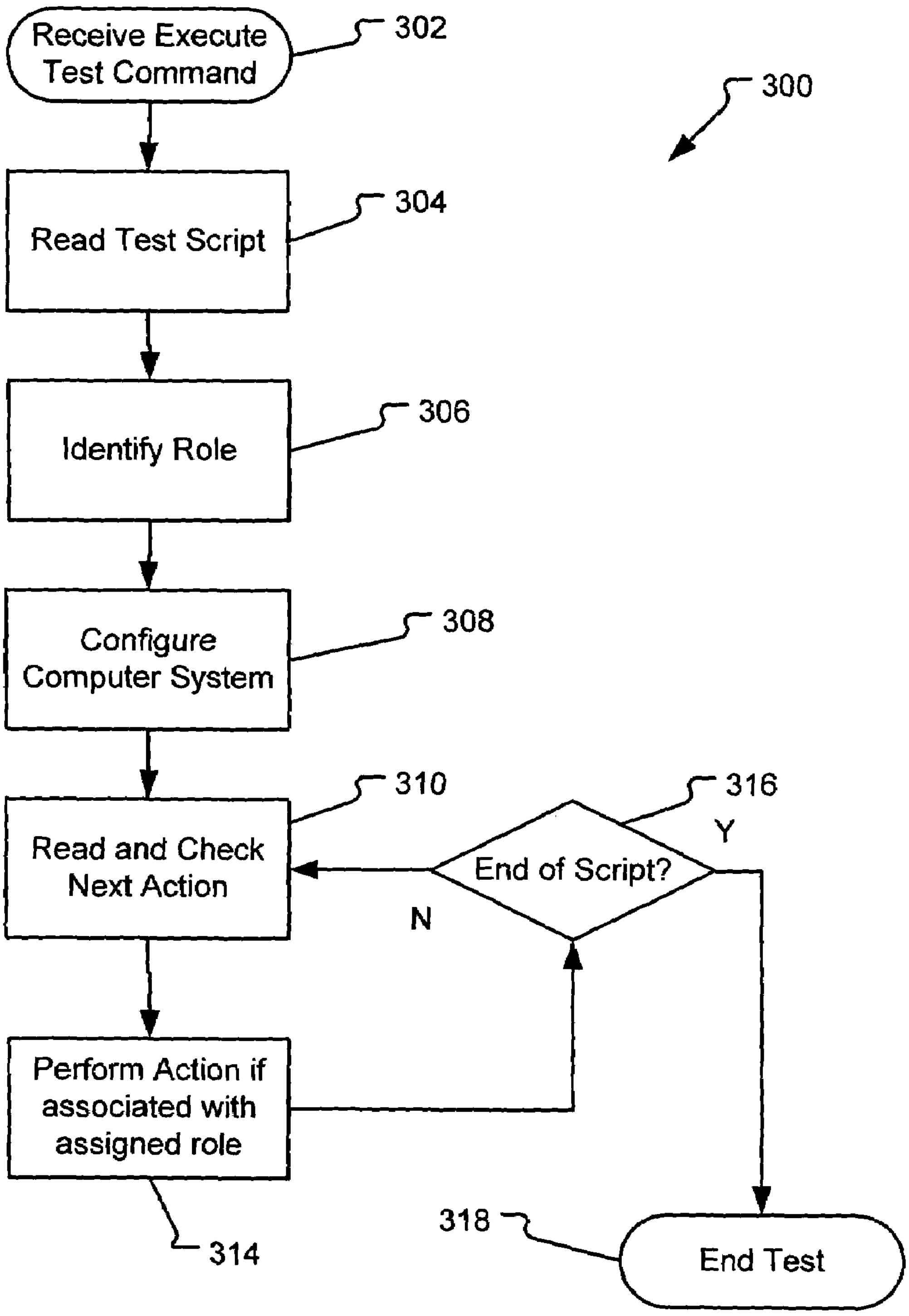
FIG. 3 illustrates the operational flow of an embodiment of a method of executing a test on a plurality of computer systems in accordance with the present invention.

FIG. 3 illustrates the operational flow of an embodiment of a method 300 of executing a test on a plurality of computer systems in accordance with the present invention. The method 300 is described at the level of a single computer system within a multiple computer system test. Thus, during an actual test the method 300 will be concurrently and independently performed on each of the computer systems of the test.

The method 300 starts on FIG. 3 with the receipt of an initiate test message from the test manager in a receive start test command operation 302. In one embodiment, the test script has been previously propagated to all of the computer systems in the test by the test manager and a specific role (such as <WFE>{2} for "Web Front End Server number 2" as will be described in greater detail below) has been previously assigned to the computer system by the test controller, possibly part of a preconfiguration operation (not shown but discussed below). In the embodiment shown, the test script is propagated to the computer system along with a data set that includes the specific role assigned to the computer system as part of the initiate test message as part of the receive start test command 302. The data set may also include additional information, such as information identifying what measurements to take during the test and where to store the results data, necessary for the test framework to initialize the data structures used in the test. In yet another embodiment, in response to the received initiate test message, the computer system retrieves or otherwise accesses a test script and the necessary data set in a remote location identified by the initiate test message. In yet another embodiment, the test script and data set is sent to one machine involved in the test, and that machine through the integrated test framework propagates the test script to the remaining computer systems in the test.

Next, the computer system executes the test script with the integrated test framework and reads the test script in a read test script operation 304. The read test script operation 304 may include the instantiation one or more objects of a test framework class, as discussed in greater detail below. These objects will expose various interfaces designed to perform the functions of the integrated test framework, such as the synchronization functions, as will be described in greater detail below.

After accessing and reading the test script, the integrated test framework identifies the role assigned to its computer system in an identify role operation 306. The role defines what portion of the test in the test script should be executed on the computer system, which in turn determines what software is exercised by the test. The test script may direct computer systems assigned a given role to configure themselves into a specific starting state, but a role does not necessarily correspond to a specific hardware or software configuration. In one embodiment, the integrated test framework includes a list of configurations that associates roles with specific computer system configurations and software. In an alternative embodiment, the test framework accesses an external database, such as one maintained by the test manager or test controller, to correlate the role with a configuration. For example, a web client role would correspond to a computer system configured to execute a browser, while a web front end (WFE) server role might correspond executing a standard web server software package and a database role might correspond to executing a database server that supports structured queries from a WFE server. Notice that this method of identifying a role is very extensible in that all a tester has to do to create a new role is to create the correspondence between the new role and the appropriate software and configuration of the test computer system and make sure the computer system has that software available for execution at the time of the test.

After the role has been identified, a configure computer system operation 308 is performed that configures the computer system in accordance with the role and initiates the appropriate software necessary to perform the role. It should be noted that in an alternative embodiment the read test script operation 304, identify role operation 306 and configure computer system operation 308 may occur as a prelude to receipt of the initiate-test command in receiving operation 302.

It should be noted that a computer system's basic configuration (i.e., what operating system and software was installed and how it is configured) may be "set" at an arbitrary point before the test scenario runs by the execution of a special "configuration scenario." Thus, the configuration scenario can be considered a way to preconfigure the computer systems in the network to a basic configuration. The tester is then aware of the basic configuration when writing the test and developing the configuration commands in the script. Thus, when tests are run a computer system can be said to "consume" that role to determine what test-specific configuration of the machine during the test is. This ability to preconfigure the entire network to a basic configuration using a preconfiguration operation (not shown) and a configuration scenario, prior to the running of the test, is an additional efficiency of the present invention as it allows a easy way to configure multiple systems that, under remoting, had to be configured separately.

In the embodiment shown, next the integrated test framework begins executing the test actions contained in the test script. First the test framework reads and checks the next action in the test script in a read and check operation 310. In this example, the next action is the first action, but as the reader will see later the read and check operation 310 may be repeated many times during the execution of the test script by the test framework. In the read and check operation 310, the computer system compares its assigned role to the role or roles identified in the test script for the next action. This may include accessing the role information in the test data set, which may be stored locally or at a remote location accessible to the test framework. An action in the test script may, or may not, be associated with the computer system's assigned role. Furthermore, an action in the test script may, or may not, be a synchronization point for the computer system, independent of whether the action is associated with the computer system's role. The read and check operation 310 may also check if the action can be executed based on the assigned role.

After the read and check operation 310, then a perform action operation 314 is performed. In the perform action operation 314 the test framework determines if the action is an action to be performed by the computer system based on the role associated with the action and one of the computer system's assigned roles (emphasizing that a computer system may be assigned, and therefore perform the actions for, more that one role identified in the test script). If the action is associated with one of the computer system's current roles, then the test framework causes the action to be performed by the software being tested on the computer system. Once the action is completed by the computer system (that is, the test framework is notified or otherwise made aware of the completion of the action by the target software), flow continues to the determination operation 316 discussed below. If the action is not associated with one of the current roles of the computer system, i.e., the action is associated with some other role assigned to one or more of the other computer systems in the multiple computer system test, the action is ignored. In either case, the test framework next determines if the test in the test script has been completed in the determination operation 316 and, if so, the test is terminated in a termination operation 318. If the test is not complete, then the test framework returns to the read next action operation 310 previously discussed.

As discussed in greater detail with reference to FIGS. 5 and 6, the perform action operation 314 also determines if the action is a synchronization point and, if so, if synchronization should occur before or after the execution of the test action itself. This analysis may be independent of whether the test action is associated with the computer system's assigned role. If the action is a synchronization point, then the perform action operation 314 performs necessary operations to synchronize the computer system as directed in the test script. These operations are discussed in greater detail with reference to FIGS. 5 and 6 and include the transmission of the appropriate notification or other communications necessary to effectuate the synchronization and the temporary halting of the testing until synchronization or a time out has occurring.

Figure 5:
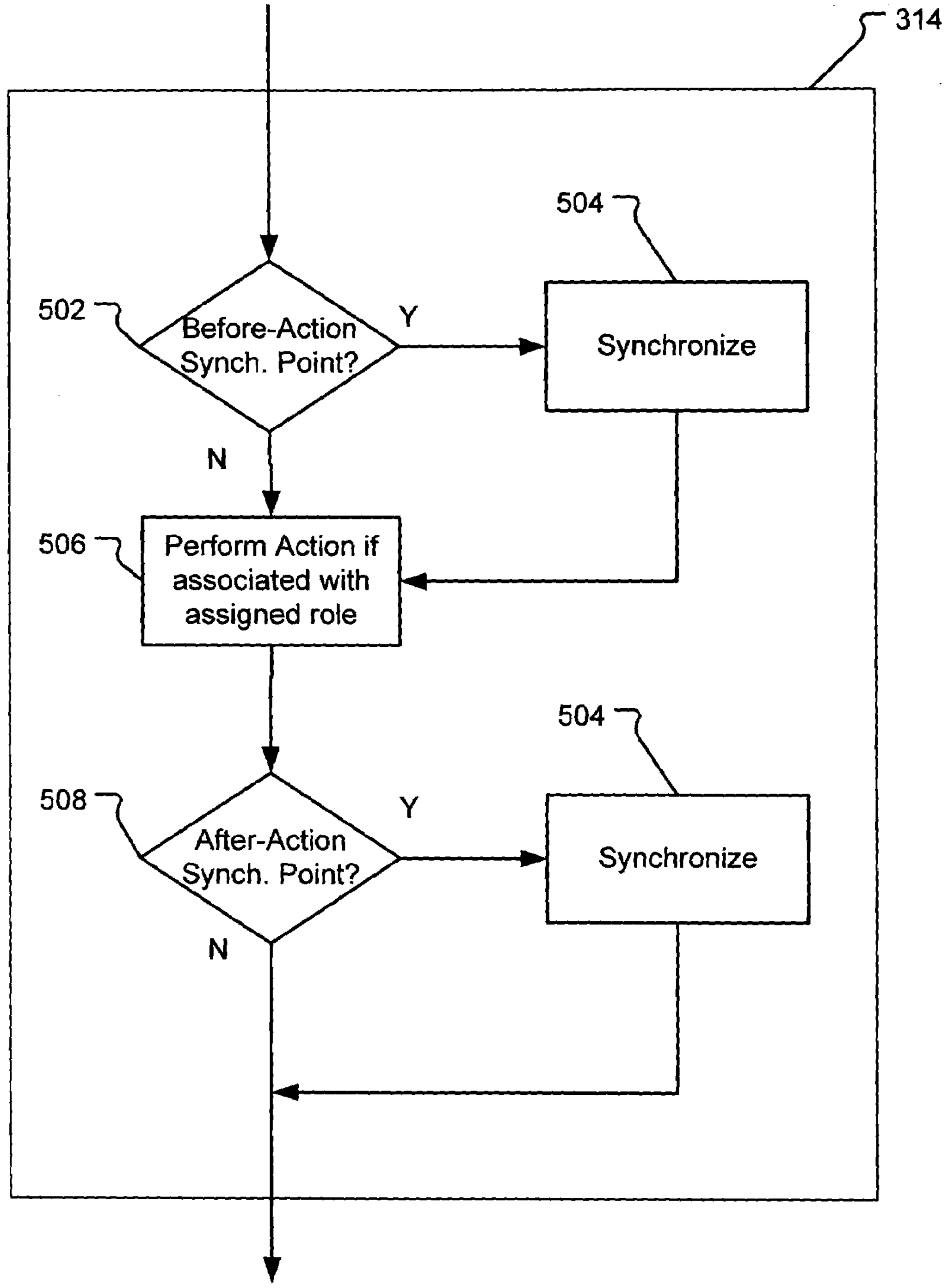
FIG. 5 illustrates one embodiment of the sub operations in a perform action operation as shown in FIG. 3 in accordance with the present invention.

FIG. 5 illustrates one embodiment of the sub operations in a perform action operation 314 in accordance with the present invention. Other embodiments that ultimately perform the same functions are also possible.

In the embodiment shown, perform action operation 314 includes a first determination operation 502 that determines if the test action is a before-action synchronization point. If so, then a synchronize operation 504 is performed and, after synchronization has occurred (assuming no timeout) operation continues with a perform action operation 506. If the test action is not a before-action synchronization point, then operation continues with the perform action operation 506.

The perform action operation 506 performs the test action as described above. This action may be any software action. A test action may a simple action that is confined to a single software component or a very complex set of actions that involve the interaction of multiple software components on multiple computer systems. For example, a test action may include opening a file, changing the name of the file, saving the file to a remote computer system, receiving information from that remote computer system confirming the success of the save operation and closing the file.

After performance of the test action, a second determination operation 508 determines if the test action is an after-action synchronization point. If so, then a synchronize operation 504 is performed and, after synchronization has occurred (assuming no timeout) operation continues and control transfers to the end of script determination operation 316. If the test action is not a before-action synchronization point, then control transfers the end of script determination operation 316.

In the embodiment shown, the testing system provides the flexibility to allow a tester to control each synchronization for each test action and to designate the synchronization to be a before-action or an after-action synchronization. Furthermore, in an embodiment it is possible for there to be both a before-action synchronization and an after-action synchronization. Such control is very convenient to test developers.

In an alternative but less preferred embodiment all synchronizations are required to be performed in a specific order relative to the performance of an action (for example, the tester may only be able to designate that the test framework synchronize before a test action). In the alternative embodiment, one or the other of the synchronization point determination operations 502 or 508 may be omitted.

Figure 6:
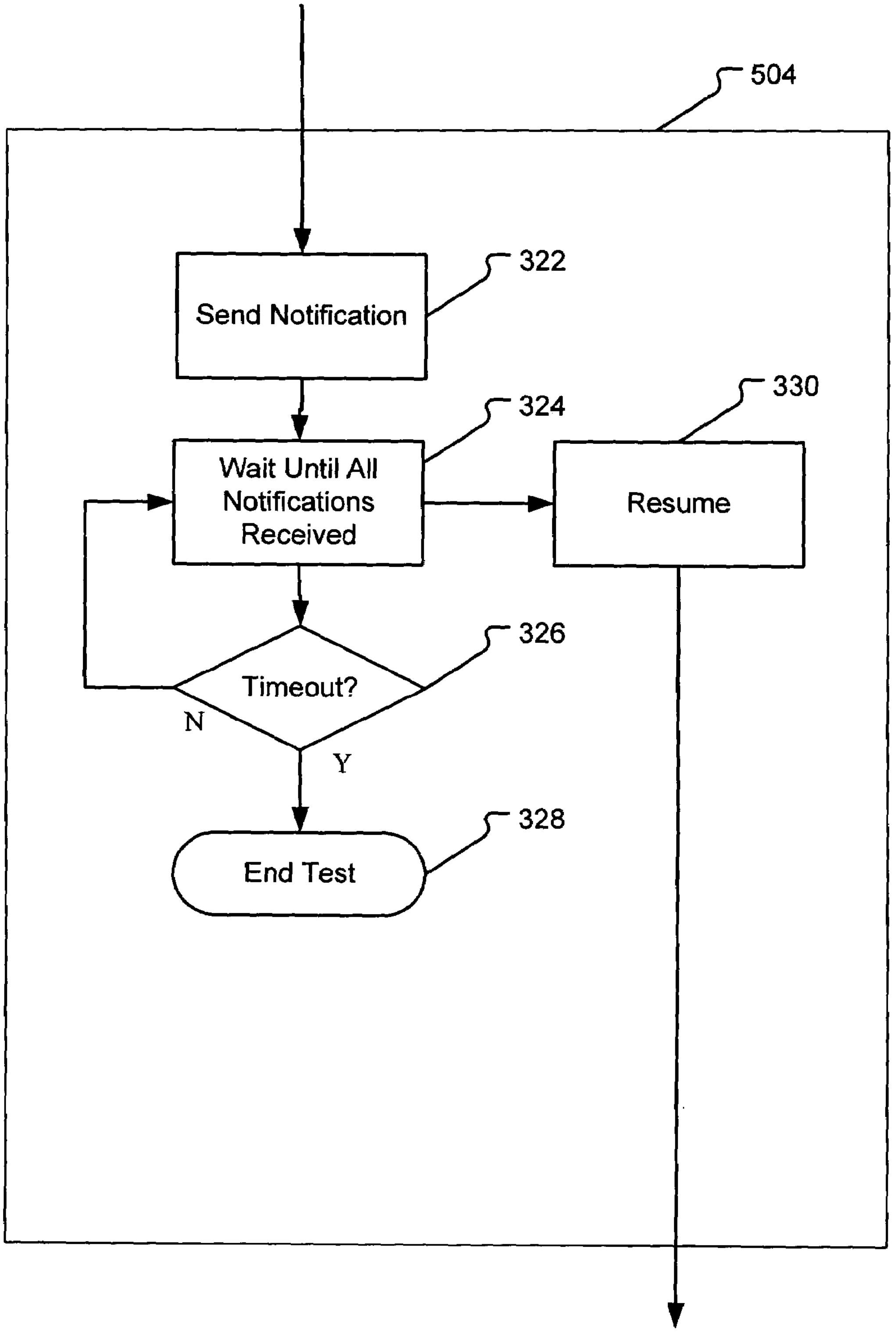
FIG. 6 is an illustration an embodiment of the operational flow of a synchronization operation as shown in FIG. 5 in accordance with an embodiment of the present invention.

FIG. 6 is an illustration an embodiment of the operational flow of a synchronization operation 504. As described above, the synchronization operation 504 performs necessary operations to synchronize the computer system as directed in the test script. Upon determining that a synchronization point has been reached in either synchronization determination operations 502, 508 in FIG. 5, operational flow transfers to a send notification operation 322 as shown on FIG. 6. In the send notification operation 322, the test framework sends a notification to the appropriate remote computer systems via the test queue manager that the computer system has reached a synchronization point. In an alternative embodiment, the notification is sent directly to each computer system in the test.

In one embodiment, the notification includes the name of the synchronization point and identifies the computer system to the test queue manager. Other information may be included as well, such as an identification of the other computer systems that are associated with the synchronization point.

Next, the test framework goes into a waiting mode and begins a timeout countdown in waiting operation 324. In one embodiment, the waiting operation 324, the test framework periodically polls the test queue manager for the notifications from the remote computer systems that are associated with the synchronization point. Alternatives to polling the test queue manager are also possible, such as distribution of each notification received from test queue manager to the test frameworks in the computer systems in the test, and equally effective in providing notification to computer systems. The test framework, from the test script, is aware of all the computer systems that are associated with any given the synchronization point. Upon determination by the test framework that all computer systems associated with the synchronization point (which need not be all the computer systems in the test) have delivered a notification to the test queue manager, the test framework resumes the execution of the test script in resume test operation 330.

The timeout countdown is provided to limit the amount of time a test's execution will be halted before ending the test in order to prevent locking up the systems for an inordinately long period of time. Such conditions may results from bugs in the software being tested or in bugs in the test code itself. The timeout countdown is measured from the time the synchronization point was reached by the computer system or, alternatively, from the time the notification was sent to the test manager. In an embodiment of the present invention, the timeout period for waiting for notification that all the computer systems are synchronized and that the test framework should resume operation is identified in the test script and associated with the synchronization point. Alternatively, a default timeout period may be applied to all synchronization points.

During the waiting operation 324, a timeout determination operation 326 determines when and if the timeout occurs. If the timeout period expires before all the necessary synchronization notifications are received by the test queue manager, then the test is terminated in a second termination operation 328 that logs an error identifying the timeout in the test results data for the computer.

A timeout will not occur if all necessary synchronization notifications are received by the test queue manager before the expiration of the timeout period. In that case, the test execution resumes in a resume test operation 330. The synchronization notifications received may take many forms depending on the embodiment. In one embodiment, they are simple notifications as would be appropriate if the computer system's next action is to send or receive a request, data, or other message to another computer system involved in the test. In another embodiment, the resume test operation 330 includes the receipt of a message from another computer system in the test via the test queue manager, the message including data or other information that is part of the test scenario. Such notifications may be stored on the test queue manager and then retrieved in part or in whole by the test framework on each computer system for processing as part of the test execution. After the synchronization has been determined in the resume test operation 330, control is returned to the appropriate point in the operational flow as shown in FIG. 5.

In an alternative embodiment, the synchronization point identifier may be a WaitFor identifier. In that embodiment, the wait operation 324 waits not for the receipt of a notification by the test queue manager, but rather for a message or other communication from the computer system identified in the WaitFor command. The WaitFor attribute adds another layer on top of synchronization described above; the fundamental details of how the communication occurs has not changed. Instead of identifying specific machines (machine types/alias), it specifies roles. Internally it translates those roles into a list of machine types. Otherwise, the WaitFor identifier is, and the method flows, the same as with the synchronization point identifier embodiment in that the WaitFor identifier includes a synchronization point name, a notification is sent to the test queue manager when the WaitFor identifier is encountered during execution of the test script, and the wait operation 324 still times out if an expected communication does arrive before some predetermined timeout period, either identified in the WaitFor identifier or determined by default.

Although not included explicitly in the description of FIGS. 3, 5 and 6, throughout the testing process the test framework is monitoring the performance of the computer system in carrying out the actions identified in the test script. The monitoring includes recording various information as results data that relates to the performance of the actions by the computer system. The results data may include the time at which various actions were initiated and completed and what errors occurred, if any. Upon termination of the test in the termination operations 318, 328, this results data may be transmitted to the test manager or some predetermined central database for easy review by a tester.

Before turning to the embodiment in FIG. 4, there should be a brief discussion of the basics of the component object model of programming. An object-oriented approach to programming provides many advantages over traditional procedural programming approaches. For example, an object oriented approach permits code reuse through inheritance and modularity through encapsulation. There are many views as to what concepts define object oriented programming, and there are many terms and definitions for defining these concepts. In general, objects incorporate procedures, also called methods or operations, and data, also called attributes or properties. Objects are instantiated from and described by structures known as classes or types. A type or class is a general abstract specification, and an object instantiated from a type is a specific concrete instance of the type stored in memory and capable of interacting with other objects. Sometimes the word "executing" is used to describe an instantiated object that is actively processing information or performing operations, as opposed being simply in a waiting state in memory waiting for calls from other objects or software.

A class consists of an interface and an implementation. The interface defines the way an instance can interact with any external objects or programs. Typically, an interface comprises variables and function declarations, wherein the variables represent the attributes of the class, and the function declarations specify methods for manipulating those attributes as well as performing other operations. The declaration specifies the name, return type, and argument or arguments, known collectively as the signature. The implementation refers to the actual code that implements the methods specified in the interface. Classes may consist of abstract classes or implementation classes. Objects are not instantiated from abstract classes. Instead, objects are instantiated from an implementation class.

In general, objects communicate through message passing mechanisms. An object, known as a client object, may call a method of another object. A client object invokes a method of another object by accessing the object via the defined interfaces. Thus, to invoke a method in an object or to query an object, the client object requires knowledge of the signatures of the methods in the interface of the target object. The client object calls the methods and passes the appropriate parameters. For example, to obtain the value of an attribute in an object, a client object calls a method, via an interface, to obtain the value.

Because of the prevalence of the component object model in modern programming, the exemplary embodiments of the present invention presented below are component object model embodiments. One skilled in the art will recognized that this is just one programming model and that the concepts described with respect to a component object model implementation can be easily adapted to a different programming model with undue experimentation.

The following is a discussion of various exemplary interfaces implemented by the integrated test framework for performing the functions described above.

ISynchronization Interface

The test framework executing the test script on each computer system provides an object implementing this interface to the test service provider, i.e., the test manager. This interface implements functionality required for multi machine synchronization and will be used directly by tests or by test attributes.

```
Synchronize(
  string syncPointName,        //in
  string [ ] machineTypes,     //in
  long timeout,                //in
  bool syncOK)                 //retval
```

This method is called from a test script or the Synchronize attribute in order to perform a synchronization between the specified machines. It takes in three inputs: the name of the synchronization point, an array of machines to synchronize with, and a value indicating how long to wait for all machines to sync (in milliseconds). The method blocks until the method completes successfully. If the synchronization is unsuccessful, an exception will be thrown. A synchronization failure is triggered by a timeout condition or invalid parameters. If more information is needed about a timeout failure, the SyncStatus method (described below) can be used to obtain such information.

The synchronization point name is used to identify the synchronization operation between all machines. The name should be unique for each synchronization operation (i.e., the same name cannot be used multiple times during a test). If the same name is used multiple times, behavior is undefined and the results data are suspect.

The array of machines to synchronize with enumerates which machines are involved in the synchronization operation. The machine specified in the list is a string representing the machine's alias (ie: "client" or "server", not "OBVT158" or "OAS-TTT005"). In an alternate embodiment the machine list is an enumeration rather that a string. If no list of machines is given (machineTypes is NULL or contains zero elements), the synchronization will be performed with all machines. If an alias is specified that does not exist in the multi-machine test, the synchronization will fail (it may or may not fail immediately, depending on the embodiment).

The timeout value specifies how long to wait in milliseconds for all machines associated with the synchronization point to reach the synchronization point. Negative values are considered invalid and will cause an immediate failure. A value of zero will cause the function to wait 0 ms for the synchronization (which will likely result in a failure). If an invalid timeout value is specified, an exception will be thrown. Care should be taken not to specify excessively large timeout values to avoid tying up test resources/machines.

The frequency at which a machine should poll for updated test data is variable, but should generally be every few seconds. The amount of time required for other machines to send a synchronization event depends upon the test in question and the speed at which the other machines execute that test. As such a reasonable estimate cannot be defined.

The Synchronize method blocks until the synchronization succeeds or the timeout value has been exceeded. After a successful synchronization, context data relating to the status of the machine will have been updated for the machines involved in the synchronization. After an unsuccessful synchronization, some of the context data under machines may be updated, but should not be depended on. To determine which machines were or were not updated, use the SyncStatus method.

The Synchronize method of synchronization provides indirect peer to peer communication through the integrated test framework. All machines involved in a test are guaranteed to be reachable using this method. It should be used infrequently to establish a common point of test execution or to exchange information between tests. While it can be used frequently to exchange small bits of information, such usage is not recommended.

Another method in the ISynchronize interface is the Status method.

```
Status(
  string syncPointName,        //in
  SyncStatus state,            //in
  string [ ] machineTypes)     //retval
```

The Status method is called to determine the status of machines in a named synchronization. It should be used to find which machines failed to synchronize, though it can also be used as an inefficient way of performing a non-blocking synchronization. It takes in two parameters: the name of the synchronization point, and the state being queried. It returns a list of machines that are currently in that state.

The sync point name is used to identify the synchronization operation. The name should be unique for each synchronization operation (i.e., the same name cannot be used multiple times during a test). If the sync point to query does not exist, machine types will be invalid and an exception will be thrown.

The state value queries the sync point for machines with the given status. There are three different sync states a machine can be in:

WAITING

Machines in this state have not yet synchronized with this machine.

REACHED

Machines in this state have synchronized with this machine.

SKIPPED

Machines in this state have not synchronized with this machine, but an action occurred which caused the synchronization to be skipped (user clicked a "skip synchronization" button or something) which caused the action to pass.

If a non-defined state is queried, the machine types list will be invalid, and an exception will be returned.

RunOn, WaitFor and SyncContext are three attributes that are can be used together in test code to achieve the goal of running tests on multiple machines. In order to support more generic Office Server scenarios, we take Role Names instead of Machine names when describe machine sets.

RunOn Attribute

RunOn attribute takes a enum parameter of the following type or take a string that follows the special format that describe the machines via their role names. The enum type it takes is:

```
enum SelectedMachines
{
AllWFEs;
AllMasterMachines;
AllClients;
AnyClient;
AnyWFE;
}
```

If the a machines set is not defined in the enum, one can use a string of the format "<Role1><Role2> . . . <RoleN>{Quantifier}" to specify the selected machines, where Role1, Role2 are role names and Quantifier is a number or a symbol for describing the number of machines among the ones that meet the requirement. The Quantifier allows more than one machine to perform a role in a given system while also allowing the tester to deterministically specify a consistent machine to run on. For example, in a two machine test in which both computer systems are assigned the same role, the Quantifier allows the tester to direct each computer system's role independently. In an embodiment, if a Quantifier identifies a computer system that isn't assigned (e.g., an action is associated with <Role>{3} when there is only one machine configured as a <Role>), the test framework automatically maps the action to a computer system that is configured in that <Role> in a deterministic fashion so that the results are predictable and consistent.

In an embodiment, a semi colon can be used to separate each machine set when there is more than one machine sets.

RunOn Example:

```
[RunOn(SelectedMachines.AllWFEs)]
[TestMethod]
void public TestMethod1( )
{
//what ever needs to be done on the machines
}
```

In this example the TestMethod1 will run on all machines that are WFEs. On all other machines in the topology, this method will simply be skipped, i.e., machines assigned a client role in the test will ignore this action when it is encountered by their test framework.

Following are a few more examples for specifying machines using their farm and role information. A farm is basically a set or cluster of machines that works together to serve clients. The terms "master" and "child" are often used when one farm controls another or uses the other farm's service. Inside a farm, there are mandatory and optional roles and there can be more than one machine for a given role.

To specify all machines in Master Farm

RunOn[SelectedMachines.AllMasterMachines]

To specify all WFEs in Master Farm

RunOn["Master><WFE>{*}"]

To specify the first WFE in the master farm

RunOn["<Master><WFE>{1}"]

To specify the first and 3rd WFE in the master farm, and 2nd WFE in the child farm RunOn["<Master><WFE>{1,3}; <Child><WFE>{2}"]

To specify first 3 WFEs in the master farm

RunOn["<Master><WFE>{1-3}"]

To specify all machines in the first Child farm

RunOn["<Child1>{*}"]

The names in < > are role names, these roles can be listed in any order; the resolving process will select the union of the machines in the each role. The symbols in the { } are the quantifier. The following are supported symbols for the quantifier

| | |
|---|---|
| * => | all |
| + => | one, currently the one in the middle |
| 4 => | $4^{th}$ |
| 1-3 => | the first 3 |
| 4-6 => | $4^{th}$ to $6^{th}$, do we need this, technically we could support this |
| 1,3 => | first one and $3^{rd}$ one |

To guarantee the same set of machines get returned regardless in what order the roles are specified, the test framework will sort the role sets alphabetically internally, so it will always look into "Master" before "WFE" for example.

In one embodiment, exceptions are thrown in the following cases:

Could not find enough machines that can play the specified role. This indicates that the test is assuming more machines than are configurable and available for that role in the test network of computer systems. If the number of machines is not important, a * should be used in the quantifier, which will result in using all available computer systems in the test network.

An empty list of machine is returned as a result of resolving the participated list. This potentially can indicate some user error or an incorrect topology is used. An example is when <WFE><Client>{1} is specified in the RunOn attribute, but there is no machine assigned to both WFE and Client.

A number that is less than 1 is used as quantifier.

Other invalid character is used in as quantifier.

A role is specified in the attribute but could not be found in the topology.

WaitFor Attribute

WaitFor attribute takes 2 or 3 parameters. The first parameter is a sync point name; it is a unique name that all participating machines should sync up to. The second parameter is the same as what is used in the RunOn attribute to designate a machine; it follows the same syntax and guidelines. The third parameter is the timeout value. In an alternative embodiment, the timeout value is optional or it can be initialized with a property set as a default for all WaitFor attributes in the test script. In an exemplary embodiment the timeout value is in the unit of seconds, and the default value is 60 seconds.

A few named parameters can be set for WaitFor attribute:

Timeout

This property can be set, and if it is set, it will overwrite the value specified as the third parameter in the constructor.

When

A enumerator type specify when to perform the synchronization, the possible values are LocationsToPerform.BeforeTestMethod LocationsToPerform.AfterTestMethod The default values for this is LocationsToPerform.AfterTestMehod. TestMethod in this case applies to a test method associated with the WaitFor attribute.

WaitFor Example 1:

```
[WaitFor("TestMethod1", "<WFE><Child>{1}; <WFE><Master>{1-2}", 120, When=LocationsToPerform.BeforeTestMethod]
[TestMethod]
Void TestMethod1( )
{
}
```

The above WaitFor Example 1 will cause a synchronization to occur before the test method executes. This synchronization will take place between the a single machine that performs both the WFE and Child1 roles, and two machines that perform both the WFE and Master roles. The synchronization has 2 minutes (120 seconds) to occur before it will timeout and fail.

WaitFor Example 2

```
[WaitFor("TestMethod1", "<WFE><Child1>{1}; <WFE><Master>{1-2}", Timeout=120]
[TestMethod]
Void TestMethod1 ( )
{
}
```

The above WaitFor Example 2 will cause a synchronization to occur after the test method occurs (the "when" parameter was not specified; thus the default value applies). This synchronization will take place between the a single machine that performs both the WFE and Child1 roles, and two machines that perform both the WFE and Master roles. The synchronization has 2 minutes (120 seconds) to occur before it will timeout and fail.

Exceptions will be thrown in the following cases:

The second parameter is the same as what the RunOn attribute is taking. Therefore, it need to follow the same syntax and an exception will be thrown if it does not the syntax as described in the RunOn attribute section.

If Timeout value is set to less or equal than 0, an Argument out of range exception will be thrown.

SyncContext Attribute

SyncContext attribute can be used when there is a need to exchange context variable among machines. An exemplary embodiment of the syntax of is the following:

```
[SyncContext(PorpertyName, SourceMachine, DestinationMachines)]
[TestMethod]
public void Method1 ( )
{
Writeline(PropertyName);
//this should print value of ProperyName that is set on the SourceMachine
}
```

The SyncContext attribute specifies the property to be exchanged in the first parameter, the machine that provides the value (the source machine) in the second parameter, and the machines that are to receive the value (the destination machines) in the third parameter. The second parameter can represent one or more machines. The second and third parameters follow the same syntax as described with reference to the RunOn attribute. It is possible to pass more than one property with the same SyncContext attribute, the property name be separated by semi colon. The properties will be from the same source to the same destinations.

Sample Test Script Illustrating SyncContext Attribute

```
[TestClass]
public class SampleTest
{
    [Context]
    public string Prop1;
    [Step(1)]
    [RunOn]"<WFE>{1}"]
    [TestDescriptior("Setting property")]
    public void Method ( )
    {
        Prop1 = "What is 6 factoria1?";
    }
    [Step(2)]
    [SyncContext["Prop1", "<WFE>{1}", "<WFE>{*}"]
    [TestDescription("Getting properties")]
    public void Method2( )
    {
        string S = Prop1; //all WFE should have the
        value set by WFE {1}
    }
    [Step(3)]
    [RunOn["<WFE>{*}]
    [TestDescription("Set value by more then one machines")]
    public void Method3
    {
        Prop1 = SystemInformation.ComputerName ( ):
    }
    [Step(4)]
    [SyncContexs("Prop1","<WFE>{*}",
    "<Search>{*}")]//may implemented later
    [TestDescription("Get value by more then one machines")]
    public Method4
    {
        UpdateProperty(Prop1, "<WFE>{1}");
        //Prop1 should have <WFE>{1}'s machine name
        UpdateProperty(Prop1, "<WFE>{2}");
        //Prop1 should have <WFE>{2}'s machine name
}
```

Pseudo Code for SyncContext attribute class

```
public class SyncContextAttribute: SupplementalAttribute
{
    void private PreInvoke( )
    {
        PushContext(string propName, string sourceMachine)
            PerformSynchronization(machineList, ...)
        PullContext(string PropName, string destinationMachine)
    }
    void private PostInvoke( )
    {
        //do nothing
    }
```

-continued

| Pseudo Code for SyncContext attribute class |
|---|
| void PushContext (string propName, string sourceMachine)<br>{<br>//get the property value pair from ContextData storage<br>//serialize the values<br>//Create a node for the context<br>//Call SetValue on QasysContextObject with the value<br>}<br>void PullContext (string PropName,string destinationMachines)<br>{<br>//for each destination machines<br>//use QasysContextObject so get the value from<br>the node that represent the property<br>//De-serialize it<br>//update the property value for each destination machine<br>} |

With the SyncContext attribute, synchronization happens automatically; the involved machines (the source machine and the destination machines) are waiting for each other to get to the same sync point. The synchronization point name is automatically generated from the class and method name. Synchronization happens before the associated test method is executed.

The machines in the source and destinations are the ones will run the test method. Therefore there is no need to add a RunOn attribute here; the information is already in the SyncContext parameters. RunOn or WaitFor are not used in conjunction with the SyncContext attribute to avoid errors. If SyncContext is used, then the RunOn and WaitFor are implicitly happening also.

FIGS. 4*a*, 4*b*, and 4*c* illustrate another embodiment of a complete exemplary test script 400 in accordance with an embodiment of the present invention. The embodiment shown is a test script in the form of a C# file, but any executable language such as C, C++, Pascal, may be used.

FIG. 4*a* includes the first portion of the test script 400. The test script starts with a set of "using" statements, as common in C# programming, that identify class names specifying that these classes are used in the execution of the test script. The using commands are followed by a namespace command that declares the namespace "MS.Internal.Test.Automation.Office. SharePointPortal.Search.Tests" which is used to resolve the classes defined in the later commands.

The test script 400 creates one class called "SampleFarmTest" which inherits from the class SearchTestBaseClass with the command "public class SampleFarmTest: SearchTestBaseClass." The following commands all within the first set of brackets "{" and "}" that follow the public class statement all define the operations of the SampleFarmTest class.

The first operation of an instantiated SampleFarmTest class is to initialize and create a variable named "RandomNumber" and assign it a random number. The next operation of the SampleFarmTest class is the method named SampleFarmTest. SampleFarmTest includes several operations called [SetUp], [Step(1)], [Step(2)], and [Teardown].

The SetUp operation of the SampleFarmTest is limited by the RunOn("<Client>{1}") to only run on the computer system assigned the role of <Client>{1}. This SetUp operation makes the client assign a random number to the variable "this.RandomNumber" and, as its actions logs a series of comments (the "this.Log.Comment" commands) to a log file on the <Client>{1} computer system as well as an indication (the "this.Log.Pass" command) that the test passed, i.e., successfully performed, the Set Up action.

The Step(1) operation of the SampleFarmTest is not limited by a RunOn attribute and is therefore executed on each computer system in the test. The operation includes a SyncContext command that reads the variable RandomNumber and its value from the computer system <Client>{1} and stores it in each of the computer systems assigned the <Search> role. In addition, the Step(1) operation also performs the actions of logging a series of comments to a log file on each of the computer systems as well as an indication that the test passed, i.e., successfully performed, the "ExchangeContent" operation.

The Step(2) operation of the SampleFarmTest is limited by a RunOn("<Search>{*}") attribute and is therefore executed on each computer system in the test assigned the role <Search>. The operation includes a WaitFor command identifying "SyncPointForTearDown" as the name of the synchronization point and designating that all the computer systems in the test ("<Client>{1};<Search>{*}") should be synchronized at this synchronization point. The WaitFor command further designates that the synchronization should occur after the method of Step(2) is performed. The actions of Step(2) operation includes logging additional comments to the log files on the <Search> computer systems and an indication that the test passed the "TestCase1" action. Note that Step(2) is only performed by the <Search> computer systems, so that absent any additional commands for the <client> computer system related to the "SyncPointForTearDown" the synchronization with fail on timeout.

The TearDown operation of the SampleFarmTest is limited by a RunOn attribute and is therefore executed on the <Client>{1} computer system in the test. The operation is another WaitFor operation that causes the <Client> computer system to synchronize to the synchronization point "SyncPointForTearDown" before performing the action of the TearDown operation. Thus, if synchronization occurs, then the TearDown actions are performed, that is a comment is written to the log and an indication that the test passed the TearDown action.

In the exemplary embodiment in FIGS. 4*a* through 4*c*, the only actions to be performed are actions related to the logging of information. However, any actions executable by the computer system in that role are also possible. For example, a client action could be to send a HTTP request to a computer system assigned a server role. Thus, the test script provides a tester with a very powerful tool to coordinate and direct the independent actions of a group of computer systems, while still controlling the points at which the computer systems should synchronize.

Although the invention has been described in language specific to computer structural features, methodological acts and by computer readable media, it is to be understood that the invention defined in the appended claims is not necessarily limited to the specific structures, acts or media described. As an example, a test manager could be implemented in the test framework and one of the computer systems is identified as the active test manager at the beginning of each test. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A system for conducting a test of software on a plurality of computer systems, each of the plurality of computer systems having a different role in the test and performing different actions, the system comprising:

the plurality of computer systems, each computer system including software involved in the test, a copy of a test script, and a test framework controlling the execution of the software based on the test script, wherein the test script specifies a role for each of the plurality of computer systems and comprises the instructions necessary for directing the actions of the plurality of computer systems;

a communication network connecting each of the plurality of computer systems; and a test manager connected to the communication network and interacting with each test framework, wherein the test framework supports independent testing of software on each of the plurality of computer systems such that the test manager may have a passive role during the test.

2. A system as defined in claim 1 wherein the test script designates at least one synchronization point in the test's execution wherein two or more of the plurality of the computer systems interact during the test.

3. A system as defined in claim 2 wherein the test framework on each of the two or more of the plurality of the computer systems that interact at the synchronization point temporarily halts the execution of the test on its computer system and sends a notification to the test manager that its computer system is at the synchronization point.

4. A system as defined in claim 3 wherein the test manager, in response to receiving notifications from all of the two or more of the plurality of the computer systems associated with the synchronization point, directs each of the test frameworks on the two or more of the plurality of the computer systems associated with the synchronization point to resume execution of the test.

5. A system as defined in claim 1 wherein the test script includes a description of the actions to be performed by each computer system based on the computer system's role.

6. A system as defined in claim 1 wherein each test framework interprets the test script and configures its computer system in accordance with the role the computer system is assigned.

7. A system as defined in claim 1 wherein the role of at least one computer system is selected from the group consisting of a client, a web front end server, a database server, and an application server.

8. A computer storage medium having computer-executable instructions for performing a method comprising:

in response to a command to execute a test framework on a computer system, reading, by the test framework, a test script, wherein the test script specifies a role for each of a plurality of computer systems and comprises the instructions necessary for directing the actions of the plurality of computer systems;

configuring, by the test framework, the computer system to perform a role assigned to the computer system in the test script, the role dictating what software is initialized and executed by the computer system;

causing, by the test framework and based on the role and a set of actions in the test script associated with the role, the computer system to perform the set of actions wherein the test framework supports independent testing of software on the computer system and on each of the plurality of computer systems such that a test manager may have a passive role during the test; and temporarily halting the performance of the set of actions at a synchronization point in the set of actions defined in the test script.

9. A computer storage medium as defined in claim 8 further comprising computer-executable instructions for performing:

sending, by the test framework, a notification to the test manager indicating the computer system has reached the synchronization point in the set of actions.

10. A computer storage medium as defined in claim 9 further comprising computer-executable instructions for performing:

resuming performance of the set of actions from the synchronization point in response to a resume message received from the test manager.

11. A computer storage medium as defined in claim 10 further comprising computer-executable instructions for performing:

generating an error if the resume message is not received from the test manager within a timeout period specified in the test script and associated with the synchronization point.

12. A computer storage medium as defined in claim 10, wherein the synchronization point is a point in the set of actions just prior to an action that requires interaction with a remote computer system executing a second test framework on the same test script but assigned a different role by the test script.

13. A computer-implemented method for testing software using a test framework, the method comprising:

in response to a command to execute a test framework on a computer system, reading, by the test framework, a test script, wherein the test script specifies a role for each of a plurality of computer systems and comprises the instructions necessary for directing the actions of the plurality of computer systems;

configuring, by the test framework, the computer system to perform a role assigned to the computer system in the test script, the role dictating what software is initialized and executed by the computer system;

causing, by the test framework and based on the role and a set of actions in the test script associated with the role, the computer system to perform the set of actions wherein the test framework supports independent testing of software on the computer system and on each of the plurality of computer systems such that a test manager may have a passive role during the test; and temporarily halting the performance of the set of actions at a synchronization point in the set of actions defined in the test script.

14. A computer implemented method as defined in claim 13 further comprising:

sending, by the test framework, a notification to the test manager indicating the computer system has reached the synchronization point in the set of actions.

15. A computer implemented method as defined in claim 14 further comprising:

resuming performance of the set of actions from the synchronization point in response to a resume message received from the test manager.

16. A computer implemented method as defined in claim 15 further comprising:

generating an error if the resume message is not received from the test manager within a timeout period specified in the test script and associated with the synchronization point.

17. A computer implemented method as defined in claim 15, wherein the synchronization point is a point in the set of actions just prior to an action that requires interaction with a remote computer system executing a second test framework on the same test script but assigned a different role by the test script.

* * * * *